(12) United States Patent
Shah

(10) Patent No.: US 12,234,785 B2
(45) Date of Patent: Feb. 25, 2025

(54) METHOD AND CONTROL UNIT FOR IDENTIFYING MISFIRE SUBJECTED CYLINDERS OF AN INTERNAL COMBUSTION ENGINE

(71) Applicant: Caterpillar Energy Solutions GmbH, Mannheim (DE)

(72) Inventor: Darshit Shah, Baden-Württemberg (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/020,389

(22) PCT Filed: Aug. 4, 2021

(86) PCT No.: PCT/EP2021/025298
§ 371 (c)(1),
(2) Date: Feb. 8, 2023

(87) PCT Pub. No.: WO2022/033719
PCT Pub. Date: Feb. 17, 2022

(65) Prior Publication Data
US 2023/0340921 A1    Oct. 26, 2023

(30) Foreign Application Priority Data
Aug. 12, 2020 (GB) .................................. 2012548

(51) Int. Cl.
*F02D 41/14* (2006.01)
*F02D 41/22* (2006.01)
*G01M 15/11* (2006.01)

(52) U.S. Cl.
CPC ......... *F02D 41/1498* (2013.01); *F02D 41/22* (2013.01); *G01M 15/11* (2013.01); *F02D 2200/1015* (2013.01)

(58) Field of Classification Search
CPC ................. F02D 41/1498; F02D 41/22; F02D 2200/1015; F02D 41/0027; F02D 19/025;
(Continued)

(56) References Cited

U.S. PATENT DOCUMENTS

| | | |
|---|---|---|
| 5,191,788 A | 3/1993 | Nishimura |
| 5,333,585 A | 8/1994 | Kuroda |

(Continued)

FOREIGN PATENT DOCUMENTS

| | | |
|---|---|---|
| CN | 1796754 | 7/2007 |
| CN | 106870185 A | 6/2017 |

(Continued)

OTHER PUBLICATIONS

GB Search Report related to Application No. GB2012548.0; reported on Jan. 21, 2021.
(Continued)

*Primary Examiner* — Joseph J Dallo

(57) ABSTRACT

Method for identifying cylinders of an internal combustion engine which are subjected to misfire during operation, comprising a step of determining whether the engine is subjected to a misfire condition; a step of measuring vibrations generated upon operating the engine; and a step of identifying at least one cylinder subjected to a misfire in dependence on the measured vibrations.

13 Claims, 6 Drawing Sheets

(58) Field of Classification Search
CPC ...... F02D 35/027; F02D 29/06; G01M 15/11; Y02T 10/30
See application file for complete search history.

(56) References Cited

U.S. PATENT DOCUMENTS

| | | | |
|---|---|---|---|
| 5,337,240 | A | 8/1994 | Nakagawa et al. |
| 5,544,058 | A | 8/1996 | Demizu et al. |
| 6,801,848 | B1 | 10/2004 | Mathews |
| 7,292,933 | B2 | 11/2007 | Christensen |
| 7,607,345 | B2 | 10/2009 | Katayama |
| 8,108,131 | B2 | 1/2012 | Huang et al. |
| 10,029,692 | B2 | 7/2018 | Nakoji et al. |
| 2004/0003651 | A1 | 1/2004 | Rauchfuss et al. |
| 2005/0126524 | A1 | 6/2005 | Funke et al. |
| 2013/0211694 | A1 | 8/2013 | Taglialatela et al. |
| 2015/0167573 | A1* | 6/2015 | Glugla ............... F02D 35/027 701/111 |
| 2015/0233289 | A1* | 8/2015 | Younkins ............ F02D 35/023 73/114.79 |
| 2016/0097367 | A1* | 4/2016 | Geckler .............. F02P 5/045 123/406.44 |
| 2017/0037798 | A1* | 2/2017 | Bizub ................ F02M 26/45 |
| 2017/0101956 | A1* | 4/2017 | Younkins ............ F02D 41/1401 |
| 2017/0218863 | A1* | 8/2017 | Geckler .............. F02P 9/002 |
| 2017/0350333 | A1 | 12/2017 | Glugla et al. |
| 2018/0052025 | A1* | 2/2018 | Gao .................. G01M 15/05 |
| 2018/0354353 | A1* | 12/2018 | Dudar ................ B60W 10/06 |
| 2019/0162158 | A1* | 5/2019 | Zurlo ................ F02D 41/1497 |

FOREIGN PATENT DOCUMENTS

| | | | | |
|---|---|---|---|---|
| CN | 107701321 | A | 2/2018 | |
| DE | 102015221447 | A1 | 5/2017 | |
| EP | 0609451 | A1 | 8/1994 | |
| EP | 0709663 | B1 | 7/2000 | |
| EP | 2843219 | A1 | 3/2015 | |
| JP | H05180063 | A | 7/1993 | |
| WO | 9002871 | A1 | 3/1990 | |
| WO | WO-2011057359 | A1 * | 5/2011 | ............. F01N 11/00 |
| WO | WO-2015179119 | A1 * | 11/2015 | ............. F02D 13/06 |

OTHER PUBLICATIONS

International Search Report related to Application No. PCT/EP2021/025296; reported on Nov. 19, 2021.

* cited by examiner

METHOD AND CONTROL UNIT FOR IDENTIFYING MISFIRE SUBJECTED CYLINDERS OF AN INTERNAL COMBUSTION ENGINE

CROSS-REFERENCE TO RELATED APPLICATION

This Application is a 35 USC § 371 U.S. National Stage filing of International Application No. PCT/EP2021/025298 filed on Aug. 4, 2021 which claims priority under the Paris Convention to Great Britain Patent Application No. 2012548.0 filed on Aug. 12, 2020.

TECHNICAL FIELD

The present invention refers to a method for identifying cylinders of an internal combustion engine which are subjected to misfire during operation and to a control unit of an internal combustion engine for carrying out such a method.

TECHNOLOGICAL BACKGROUND

For ensuring high efficiency, internal combustion engines are designed to combust an air fuel mixture within its cylinders in a timely controlled manner so as to, under ideal operating conditions, develop peak pressure in its cylinders at ideal time for maximum recovery of work from expanding gases generated upon combustion. For doing so, ignition of the air fuel mixture and propagation of a flame front within the combustion chamber needs to take place according to a strictly defined pattern. However, any deviation from ideal operating conditions may lead to a less favorable combustion of the air fuel mixture and thus to a deterioration of the engine's performance and efficiency.

During operation, the engine, i.e. individual cylinders thereof, may be subjected to poor or no combustion such that no significant energy conversion takes place and thus no significant pressure and temperature rises are experienced in individual cylinders. These undesired and unintended phenomena constitute a malfunction of the engine and may generally be referred to as misfire or combusting misfire.

Combustion misfire may be caused by many different reasons. For example, a malfunction of an ignition system, i.e. a spark plug, may cause poor or no combustion in individual cylinders of the engine. Alternatively, an intake system of the engine may be subjected to a malfunction such that the air fuel mixture fed into combustion chambers of the engine has an unfavorable composition, e.g. having an air fuel ratio lying outside of a combustible range.

Besides deterioration of engine's performance and efficiency, misfire may lead unburnt fuel to enter the exhaust system of the engine. In this way, upon expelling unburnt fuel through the exhaust system into environment, misfire may contribute to damages of catalytic converters present in the exhaust system and to environmental pollution. Further, analysis of misfire phenomena is a key enabler for many failure mode detection and emission relevant control approaches. As a result, the detection and evaluation of misfire phenomena occurring during operation of the engine has constantly been in focus among different engines types and applications.

From the prior art, misfire detection methods are known for identifying continuous misfire conditions within individual cylinders, i.e. misfires which occur continuously among subsequent operating cycles of the engine, for example by identifying defect spark plugs of an ignition system. However, the known approaches are not suitable of detecting malfunction conditions in which poor combustion or intermittent misfire phenomena, i.e. which occur intermittently or during only a certain number of operating cycles, take place.

SUMMARY OF THE INVENTION

Starting from the prior art, it is an objective to suggest an improved misfire monitoring method for an engine, which in particular enables to more accurately evaluate and classify misfire phenomena occurring during operation. A further objective is to provide a control unit of an internal combustion engine configured for carrying out such a misfire monitoring method.

These objectives are solved by means of the subject matter according to the independent claims. Preferred embodiments are set forth in the present specification, the Figures as well as the dependent claims.

Accordingly, a method is provided for identifying cylinders of an internal combustion engine which are subjected to misfire during operation, comprising the steps of determining whether the engine is subjected to a misfire condition; measuring vibrations generated upon operating the engine; and identifying at least one cylinder subjected to a misfire in dependence on the measured vibrations.

Furthermore, a control unit of an internal combustion engine is provided for identifying cylinders of the engine which are subjected to misfire during operation of the engine. The proposed control unit is configured to perform the method as described above. Accordingly, technical features which are described in connection with the above method in the present disclosure may also refer and be applied to the proposed control unit, and vice versa. Specifically, the control unit is configured for determining whether the engine is subjected to a misfire condition, for obtaining at least one vibration signal being indicative of a vibration generated by the engine upon operation and measured by a vibration sensor, and for identifying at least one cylinder subjected to a misfire in dependence on the vibration signal.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
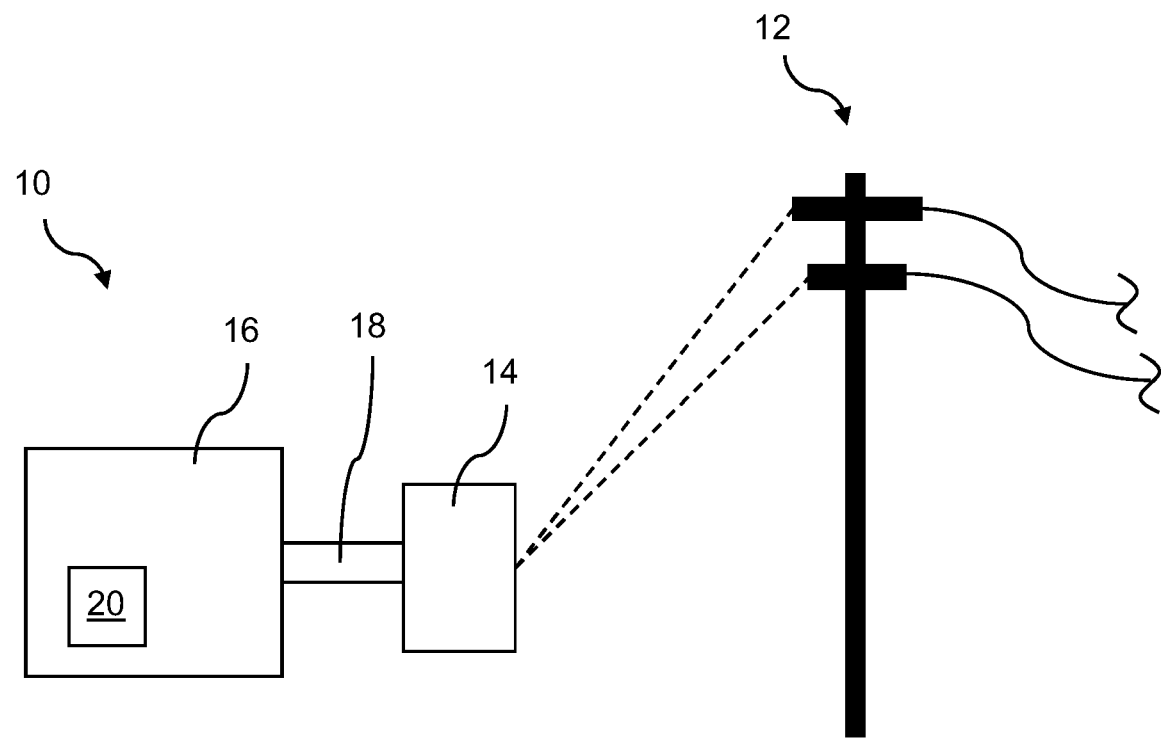
FIG. 1 schematically shows a power generation unit equipped with an internal combustion engine.

In the following, the invention will be explained in more detail with reference to the accompanying figures. In the Figures, like elements are denoted by identical reference numerals and repeated description thereof may be omitted in order to avoid redundancies.

FIG. 1 schematically shows a power generation unit 10 for generating electric power to be provided to an electrical grid 12. The electric grid 12 may be of any suitable size and, for example, may be a decentral or national grid being connected to a plurality of power generation units, but is not limited to this configuration. Rather, in one configuration, the electric grid 12 may be provided with electric power generated by only one power generation unit. The power generation unit 10 may constitute or be part of a power plant and comprises at least one generator 14 which is driven by an internal combustion engine 16, also referred to as the "engine" in the following, to convert mechanical energy into electric power fed to the electrical grid 12. Accordingly, the generator 14 is electrically connected to the electrical grid 12 and coupled to the internal combustion engine 16 in a torque-transmitting manner. Specifically, the generator 14 is coupled to an output shaft 18 of the engine 16 such that, during operation of the engine 16, the generator 14 is actuated by the output shaft 18.

The engine 16 is an internal combustion engine, in particular a reciprocating engine. Specifically, the engine 16 may be a stationary gas engine which is powered with a fuel air mixture of a gaseous fuel and air, for example a mixture of natural gas and air. The engine 16 comprises a plurality of cylinders, e.g. eight or twelve or eighteen cylinders, which may be arranged according to an in-line engine configuration, V-configuration or any other known cylinder configuration.

Each cylinder is provided with a combustion chamber delimited by a piston accommodated in the cylinder. The piston is configured for reciprocating and axial movement within the cylinder and is coupled to a crank shaft of the engine such that the reciprocating movement of the piston is transferred into rotating movement of the crank shaft.

During operation of the engine 16, the air fuel mixture is supplied to and ignited in each cylinder so as to produce high-temperature and high-pressure gases which apply forces to and thus axially move the associated pistons, thereby rotating the crank shaft and thus the output shaft 18 which is coupled thereto in a torque-transmitting manner. In this way, chemical energy, at first, is transformed into mechanical energy of the output shaft 18 which drives the generator 14 and then, by virtue of the generator 14, into electrical energy. In one configuration, fresh air may be mixed with the fuel medium to generate the air fuel mixture before entering the combustion chambers. Alternatively, fresh air and the fuel medium may be separately supplied into and thus mixed within the combustion chambers, e.g. by means of fuel pumps injecting the fuel medium into the combustion chambers.

The engine 16 further comprises a control unit 20, also referred to as "engine control unit" or "engine control module", which is configured to control and monitor operation of the engine 16. Specifically, the control unit 20 is of an electronic control unit type and is configured to read out measurement data from a plurality of sensors monitoring a variety of engine operating parameters. Further, the control unit 20 is configured to process and interpret the thus acquired measurement data and, in response, control actuation of a plurality of engine actuators so as to set and adjust an operating point of the engine, e.g. by controlling ignition properties, such as amount and composition of air fuel mixture to be fed to and ignited in the combustion chambers, ignition timing, valve actuation and timing, etc.

The basic structure and function of such an internal combustion engine 16 and its components, in particular the control unit 20, are well known to a person skilled in the art and are thus not further specified. Rather, a method for monitoring operation of the engine and for identifying misfire subjected cylinders is addressed in the following which is interlinked with the present invention. This method is intended and configured for detecting and specifying misfire conditions occurring during operation of the engine 16 and is also referred to as the "method" in the following.

In the context of the present disclosure, the terms "misfire condition", "misfire" or "combustion misfire" refer to any undesired and unintended deterioration of the combustion process taking place in at least one cylinder of the engine during an operating cycle which affects performance or efficiency of the engine. For example, this may be the case when no combustion or an incomplete combustion takes place in at least one cylinder during operation. A misfire condition in the sense of the present disclosure refers to at least one of a no combustion condition and an incomplete or poor combustion condition. Specifically, in the context of the present disclosure, the term "no combustion condition" refers to an operating cycle of a cylinder in which no combustion takes place. The terms "incomplete combustion condition" or "poor combustion condition" refer to an operating cycle of the cylinder during which the air fuel mixture present in the associated combustion chamber is incompletely burned, i.e. only a part thereof is combusted. Further, the term "distorted combustion condition" refers to an operating cycle of the cylinder in which a flame front generated in the air fuel mixture present in a cylinder upon ignition does not propagate in a desired manner, e.g. due to engine knocking, and/or combustion is not initiated at a desired timing.

In general, the term "operating cycle" refers to a combustion cycle of one cylinder which comprises the steps of: supplying an air fuel mixture into the cylinder; combusting the air fuel mixture; and discharging exhaust gases from the engine thereafter. Typically, the operating cycle is associated to one or more piston strokes within the cylinder.

The proposed method is suitable and configured to detect and classify different types of misfire conditions, i.e. to determine whether the detected misfire refers to a no combustion condition or to an incomplete combustion condition. In the context of the present disclosure, the term "type of misfire condition" refers to a misfire condition or a set of misfire conditions having a predefined characteristic or a characteristic lying within a predefined range. By doing so, a combustion characteristic of a misfire with regard to a single operating cycle may be specified.

In addition, the proposed method is suitable to detect and specify different types of misfire events, such as continuous, intermittent and single misfire events. Specifically, the term "continuous misfire event" refers to a malfunction of a cylinder in which a misfire occurs continuously, i.e. among subsequent operating cycles of the engine. The term "intermittent misfire event" refers to a malfunction of a cylinder in which misfire occurs intermittently among subsequent operating cycles. In other words, in a cylinder affected by such a malfunction, proper operating conditions and misfire conditions may alternate. Further, the term "single misfire event" refers to a malfunction of a cylinder in which misfire occurs only in a single operating cycle among a set of subsequent operating cycles. By specifying the type of misfire event, a combustion characteristic of a misfire with regard to a plurality of subsequent operating cycles may be specified.

In the shown configuration, the control unit 20 is configured to carry out the method which is described in the following with reference to flow diagrams shown in FIGS. 2 to 6. At first, an overview of the method's general procedure is described with reference to FIG. 2, before individual method steps and their underlying procedures are specified in more detail with reference to FIGS. 3 to 6.

Figure 2:
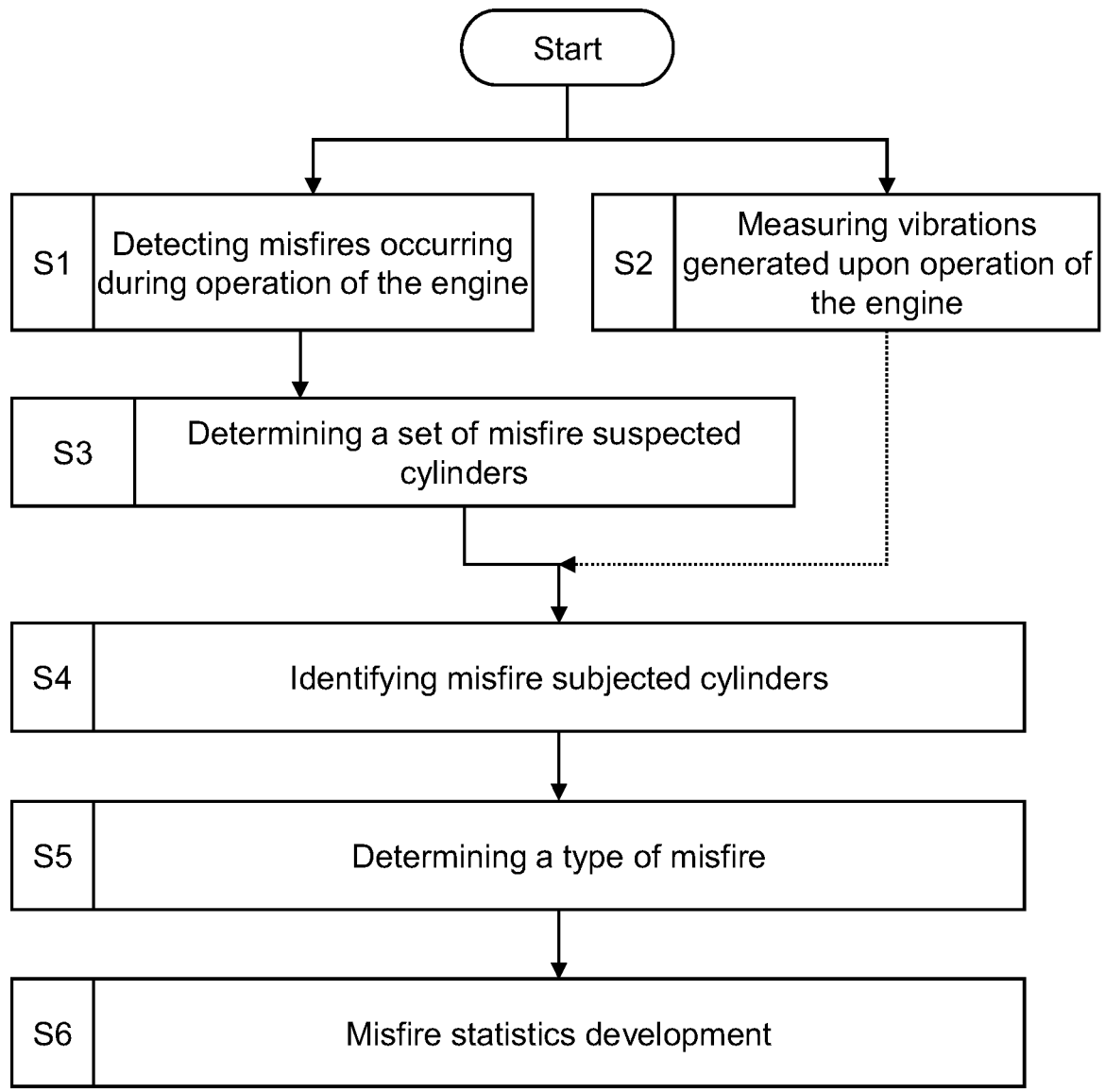
FIG. 2 schematically shows a flow diagram illustrating an overview of a method for identifying misfire subjected cylinders during operation of the internal combustion engine depicted in FIG. 1.

FIG. 2 depicts a general overview of the proposed method for monitoring misfire phenomena in the engine 16. In the context of the present invention, it has been found that, for providing an improved engine monitoring concept or approach, e.g. which qualifies as a key enabler for improved subsystem malfunction detection and evaluation as well as emission control approaches, further information is required which goes beyond the mere detection whether a misfire phenomenon has occurred or not. To this end, the proposed method is intended and configured for providing additional information about detected misfire phenomena by identifying the location where the misfire has occurred and by specifying combustion characteristics of the misfire.

For doing so, the proposed method, when being carried out by the control unit 20, provides information about: whether and when a misfire condition occurs or has occurred, cf. step S1; a location where the misfire occurred, i.e. the cylinders which are or have been affected by the misfire, cf. steps S3 and S4; the type or combustion characteristics of the misfire, cf. step S5. In this way, the proposed method provides profound information about misfire phenomena occurring during operation of the engine, thereby allowing for an improved evaluation and analysis of misfire conditions.

The method is initiated upon starting up the engine 16. In a first step S1, the control unit 20 determines or detects the occurrence of a misfire. In other words, in this step, the control unit 20 determines whether the engine 16 is subjected or has been subjected to a misfire condition during operation or not.

In parallel, a step S2 is performed in which vibrations generated upon operating the engine are measured and provided to the control unit 20. For doing so, the method makes use of one or more vibration sensors attached to or provided in the engine 16. Accordingly, the control unit 20 obtains one or more vibration signals provided by the at least one sensor unit, wherein each one of the vibration signals is indicative of the vibrations generated by the engine 16. Further, each vibration signal may represent vibrations generated during operation which were measured at different sites at the engine as will be described in more detail below.

In case the control unit 20 determines in step S1 that a misfire has occurred, the method proceeds to step S3 in which a set of misfire suspected cylinders is determined. The term "misfire suspected cylinders" refer to cylinders which are likely to be or have been subjected to a misfire. In other words, in this step, a preselection or predetermination is made to limit the number of cylinders, the operation of which is subjected to further calculation or determination. In this way, a multi-step approach is provided which allows for an effective and efficient monitoring and specification of misfire conditions.

Subsequently, the method proceeds to step S4 in which the control unit 20 identifies those cylinders which are subjected to the misfire, i.e. which actually experience or have experienced the misfire. For doing so, the control unit 20 takes into account the vibration signals obtained in step S2. In other words, in this step, the control unit 20 identifies at least one cylinder subjected to the misfire in dependence on the measured vibrations, i.e. the obtained vibration signals, as indicated by a dotted connecting line in FIG. 2. By doing so, the step determines a misfire location, i.e. in which cylinder or cylinders the misfire occurs or has occurred.

In a subsequent step S5, the control unit 20 further specifies the detected misfire by determining the type of misfire based on its combustion characteristics. This step is performed in dependence on the measured vibrations obtained in method step S2. Specifically, in this step, the type of misfire condition is determined, i.e. whether a no combustion condition or an incomplete combustion has occurred. Further, it is determined to which misfire event the detected misfire is associated, i.e. whether the detected misfire constitutes or relates to a continuous, intermittent or single misfire event.

Thereafter, the method proceeds to step S6 of providing misfire statistics and thus constitutes a misfire statistics development block. In this step, the occurrences of misfire and their classification are monitored during operation of the engine 16 and processed for further usage of such information. For example, in this step, the occurrences of misfire may be accumulated for a certain time period based on their classification, e.g. based on their type and/or location, thereby providing the functionality of a counter which indicates how frequently misfire phenomena have occurred during a certain period of time during operation of the engine 16. In this way, a misfire statistic may be provided.

The misfire statistic may be used for determining proper functionality of the engine 16 and its components, such as the ignition system, or to assess whether the engine 16 should be subjected to maintenance work or further analysis. For example, the control unit 20 may accumulate the occurrence of misfire conditions, e.g. intermittent misfire condition, occurring during operation of the engine 16 to determine an occurrence frequency indicating how often misfire occurs during operation. Further, the control unit 20 may compare the thus determined frequency with a threshold and, when the determined frequency reaches that threshold, output a signal indicating that the engine is to be subjected to maintenance work or further analysis.

All the information related to the misfire statistic may be broadcast by the control unit 20 to other components of the engine 16 or systems inside or outside the power generation unit 10, e.g. via a CAN bus or Modbus or Ethernet communication link.

The procedure illustrated by steps S1 to S6 constitutes an analysis loop, which is repeatedly carried out and initiated at predetermined events. Specifically, the analysis loop may be carried out during or for an associated time period during operation of the engine in order to determine whether a misfire occurred during the considered time period and to classify it. Specifically, the analysis loop may be periodically initiated, i.e. at predetermined timings and/or at regular intervals. The time period associated to the analysis loop may refer to one or more operating cycles of the engine. Specifically, the analysis loop may be initiated and performed for one or more operating cycles per cylinder. Further, successive analysis loops constituted by steps S1 to S6 may be performed in a continuous loop, i.e. directly one after the other, or with a delay time in between.

Figure 3:
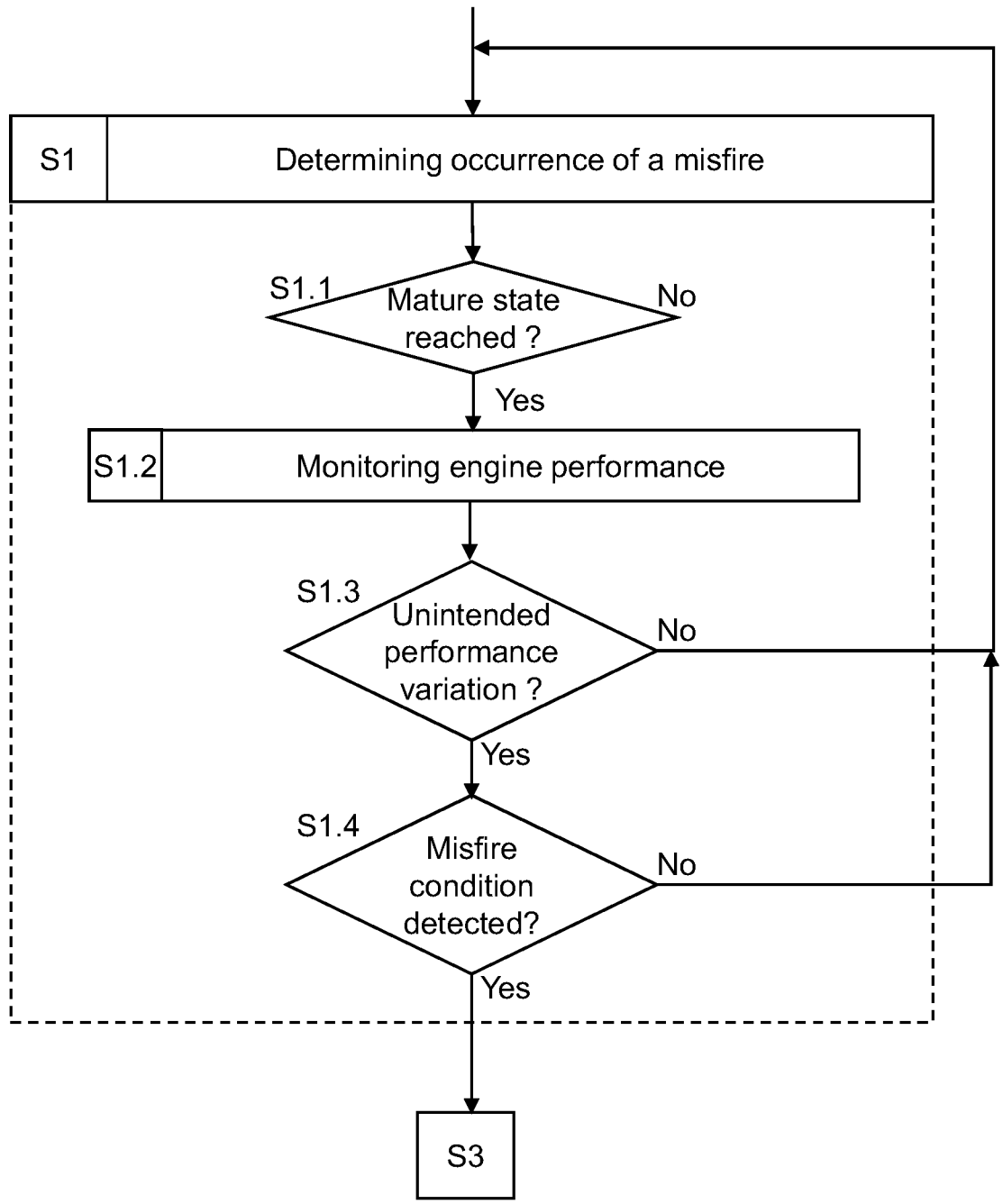
FIG. 3 schematically shows a procedure of a step of the method for determining the occurrence of misfire phenomena during operation of the engine.

In the following, step S1 of determining the occurrence of a misfire is further specified with reference to FIG. 3, which illustrates the underlying procedure of step S1, i.e. its sub-steps and their interaction. In general, step S1 is intended and performed for determining whether the engine 16 is affected by or subjected to a misfire. This step is intended for detecting whether a misfire occurs or has occurred, but may not further classify the misfire. Rather, for further specifying and classifying the misfire, steps S3 to S5 are performed after the occurrence of a misfire has been determined in step S1.

In a first sub-step S1.1, the control unit 20 determines whether the engine 16 is operated in a predetermined operating state, i.e. a warmed-up or mature operating state. In this way, it may be ensured that the engine 16 has reached a stable operating point at which the engine 16 can be run at stable conditions and at high efficiency. The predetermined operating state may further serve as a reference state of the engine 16 which allows for effectively evaluating operation thereof. In this sub-step, the control unit 20 may monitor at least one engine operating parameter, such as engine speed, engine temperature, etc., and determine that the engine is in a mature state when at least one or each one of the at least one operating parameter has reached a predetermined threshold or lies within a predetermined range.

If it is determined that the engine 16 is not in its mature state, the method returns to the beginning of step S1 and the analysis loop, i.e. step S1, is reinitiated at a predetermined delay time. However, when it is determined that the engine 16 is run in the predetermined operating state, i.e. the mature state, the method proceeds to a second sub-step S1.2 in which the control unit 20 monitors operation of the engine 16, i.e. performance of the engine 16. For doing so, the control unit 20 receives or obtains at least one engine operating signal.

In the context of the present disclosure, the term "engine operating signal" refers to any parameter suitable to quantify engine performance and operation, e.g. an operating point of the engine, over time, i.e. during operation of the engine 16. Specifically, in sub-step 1.2, the control unit 20 determines at least one engine operating signal which is indicative of an engine speed or power output by the engine over time. In a further development, the control unit 20 may determine further engine operating signals being indicative of at least one of an engine load, a pressure prevailing in the engine, such as intake manifold pressure, and a differential pressure at a throttle valve of the engine 16. For receiving the at least one engine operating signal, the control unit 20 is connected to at least one measurement unit which is configured to measure engine operating parameters, to process the measured parameters and to transmit it in the form of the engine operating signal to the control unit 20. Alternatively, the control unit 20 may be configured to receive the measured parameters and to process it in order to generate the engine operating signal.

Thereafter, in sub-step S1.3, the control unit 20 is configured to detect an unintended performance variation of the engine during its operation in dependence on the obtained engine operating signal. In other words, in this step, the control unit 20 determines whether the engine 16 is subjected to an unintended performance variation, in particular an unintended performance drop, or not. This step refers to the associated time period. This means that the control unit 20 determines whether the engine 16 is or has been subjected to an unintended performance variation during the associated time period. For doing so, the control unit 20 analyzes the engine operating signal acquired in sub-step S1.2 which is indicative of the engine's performance during the associated period of time.

According to one configuration, during sub-step S1.3, the control unit 20 may be configured to determine an engine power signal being indicative of an actual performance or power output by the engine 16 and/or an engine speed signal being indicative of an actual engine speed, i.e. indicating a rotation frequency of the crank shaft and/or a cam shaft of the engine, in particular the number of rotations of the crank shaft and/or cam shaft per unit of time. For obtaining the engine power signal, the control unit 20 may be in communicative exchange with a first measurement unit configured for performing current transformer measurements and potential transformer measurements at the generator 14. In other words, the first measurement unit is configured to measure operation of the generator 14 and, based thereupon, to generate the engine power signal. For obtaining the engine speed signal, the control unit 20 may be in communicative exchange with a second measurement unit provided in the form of at least one pick-up sensor coupled to the crank shaft and/or cam shaft of the engine 16. Accordingly, the second measurement unit is configured to measure engine speed and, based thereupon, to generate the engine speed signal.

Further, the control unit 20 may be configured to process to thus obtained engine power signal and/or engine speed signal, e.g. by performing a filtering step for eliminating spikes and high-frequency noise from the signal and/or by calculating a derivative. Then, the control unit 20 may analyze the engine power signal and/or engine speed signal to determine whether an unintended performance variation has occurred during operation, i.e. in the associated time period. For doing so, for example, the control unit 20 may compare the magnitude of the derivative of the engine power signal and/or engine speed signal with associated thresholds or threshold ranges. Accordingly, in case the control unit 20 determines that the associated thresholds or threshold ranges are not reached, the control unit 20 does not detect an unintended performance variation and returns to the beginning of the analysis loop. However, if the control unit 20 determines that the associated thresholds or threshold ranges have been reached, the control unit 20 detects and unintended performance variation and proceeds to sub-step S1.4 of validating the measurement signal.

In sub-step S1.4, the engine operating signals obtained in sub-step S1.2 are analyzed to validate functionality of the engine 16 so as to determine whether the unintended performance variation is caused by a misfire phenomenon. In other words, the control unit 20 checks and validates whether the measured engine operating signals properly represent the operation and functionality of the engine 16. By doing so, the condition and functionality of the engine 16 as well as the measurement units employed for the method are assessed to exclude certain failure conditions which may cause or indicate an unintended performance variation of the engine, but are not related to a misfire condition. Accordingly, sub-step S1.4 may also be referred to as a qualification step.

When it is determined that the engine operating signals are not in a proper condition, the method returns to the beginning of the analysis loop. However, if it is determined that the engine operating signals are in a proper condition, the method proceeds to method step S3.

Further, when a misfire condition is detected, the control unit 20 determines a misfire point of time, i.e. the point in time when the misfire occurred during operation of the engine. For doing so, the control unit 20 determines when the unintended performance variation occurred. In other words, the control unit 20 performs a step of determining a misfire point of time in dependence on the engine operating signal. Alternatively or additionally, the control unit 20 may take into account the vibration signals obtained in step S2 for determining the misfire point of time.

As set forth above and as can be gathered from FIG. 2, in parallel to step S1, step S2 is carried out in which the control unit 20 obtains the vibration signals being indicative of measured vibrations generated upon operation of the engine 16. The vibration signals are generated and provided by at least one vibration sensor. Further, the control unit 20 or the vibration sensor may be configured to process to thus obtained vibration signal, e.g. by performing a filtering step for eliminating spikes and high-frequency noise from the signal.

In the shown configuration, a plurality of vibration sensors are used which are distributively arranged at or in the engine 16. Preferably, the vibration sensors are arranged such that they are associated to different cylinders of the engine 16. In this context, a vibration sensor which is associated to a cylinder means that it is arranged in the vicinity to this cylinder. Specifically, one vibration sensor may be provided per cylinder or per a certain number of cylinders. According to one configuration, the number of vibration sensors may correspond or be greater than the number of cylinders which are operated in the same cycle or tact, i.e. which are synchronously operated, during operation of the engine 16. In this way, at least one vibration sensor may be associated to or be arranged in the vicinity to one of the plurality of cylinders which are operated in the same cycle or tact.

The employed vibration sensors are configured to sense vibrations generated upon operating the engine 16 and to generate a vibration signal, respectively, being indicative of a vibration sensed by the vibration sensor over time. For doing so, the vibration sensor may be configured to measure movement, i.e. oscillating movements, of the engine 16. For doing so, the vibration sensor may be provided in the form of an accelerometer. Such an accelerometer may be configured to sense inertial forces acting on a test mass provided therein. In this way, movement or vibrations induced by the engine may be transferred into an electrical signal, i.e. the vibration signal. According to one configuration, at least one vibration sensor may be provided in the form of a knock sensor which are used in known engine configuration for detecting engine knocking. In other words, the vibration sensors may have a function, in particular a main function, of detecting and thus of protecting the engine from abnormal combustion events, such as combustion detonation or knocking, wherein the proposed solution allocate a further function to these sensors, namely to identify cylinders subjected to misfire. By doing so, the proposed method makes use of hardware which is already present in known engine configurations for classifying misfire phenomena, without using any extra or additional sensors or measurement techniques, thereby providing a cost effective approach. According to one configuration, when a misfire condition is detected, the control unit 20 may switch the function of the vibration sensor from monitoring knocking phenomena to monitoring misfire phenomena. Alternatively or additionally, at least one vibration sensor may be provided in the form of a microphone device which is configured to sense vibrations in the form of acoustic waves propagating through the engine 16 and/or air surrounding the engine 16.

Figure 4:
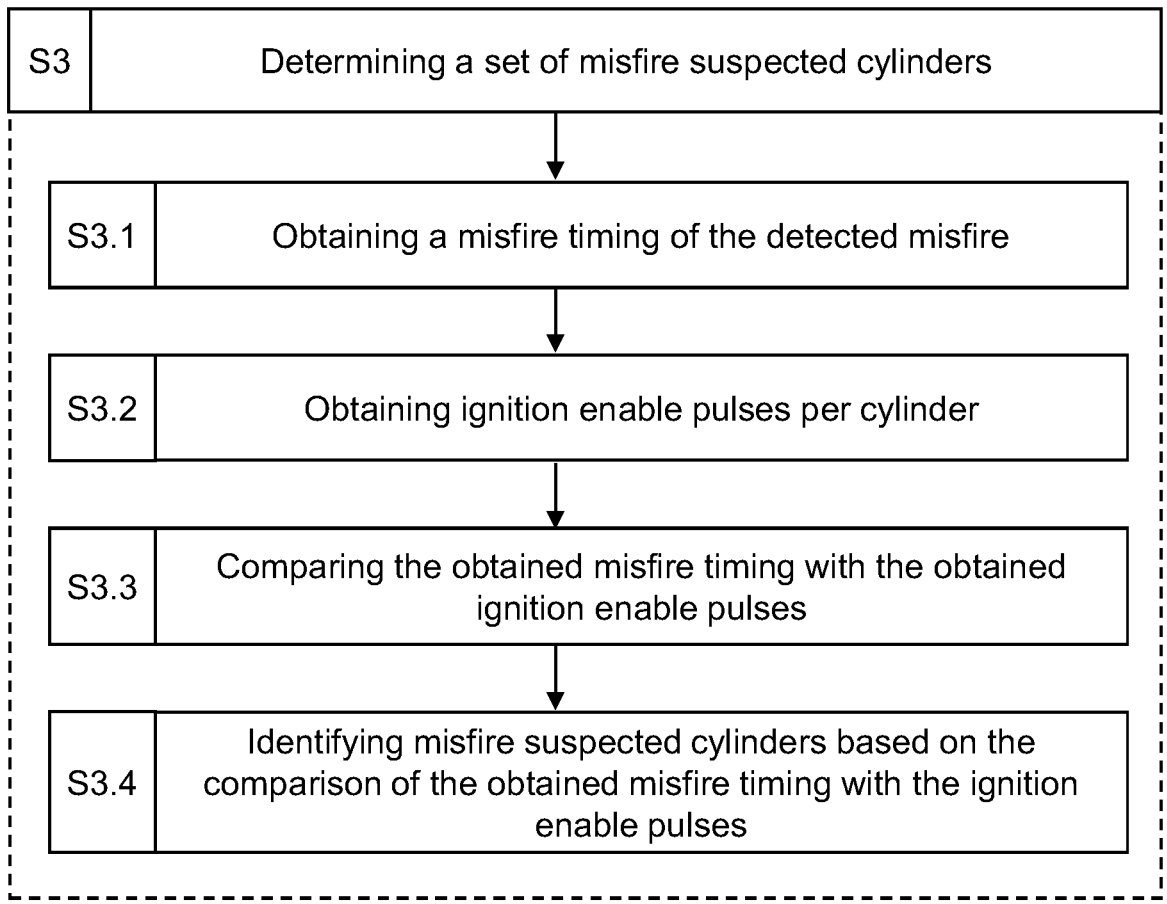
FIG. 4 schematically shows a procedure of a step of the method for determining a set of misfire suspected cylinders.

As set forth above, when it is determined in step S1 that the engine 16 is subjected to a misfire, the method proceeds to step S3 depicted in FIG. 4 in which a set of misfire suspected cylinders is determined. In this step, at first, the control unit 20 obtains the misfire point of time determined in Step S1, cf. sub-step S3.1, and ignition enable pulses per cylinder, cf. sub-step S3.2, which are indicative of timings at which ignition pulses are provided for igniting fuel air mixtures in the respective cylinders. Accordingly, the term "ignition enable pulse" refers to a pulse in response of which an ignition system initiates combustion in a respective cylinder of the engine 16, particularly by producing a spark within the associated combustion chamber with a spark plug. Then, in sub-step S3.3, the control unit 20 compares the misfire point of time with the ignition enabled pulses for each cylinder. Specifically, for doing so, the control unit 20 determines those ignition enable pulses which are activated or generated within a predetermined temporal range around the misfire point of time. Thereafter, those cylinders are identified which are associated to the determined ignition enable pulses falling within the temporal range. As a result, the thus identified cylinders constitute the set of misfire suspected cylinders. The set of misfire suspected cylinders may comprise one or more identified cylinders.

Figure 5:
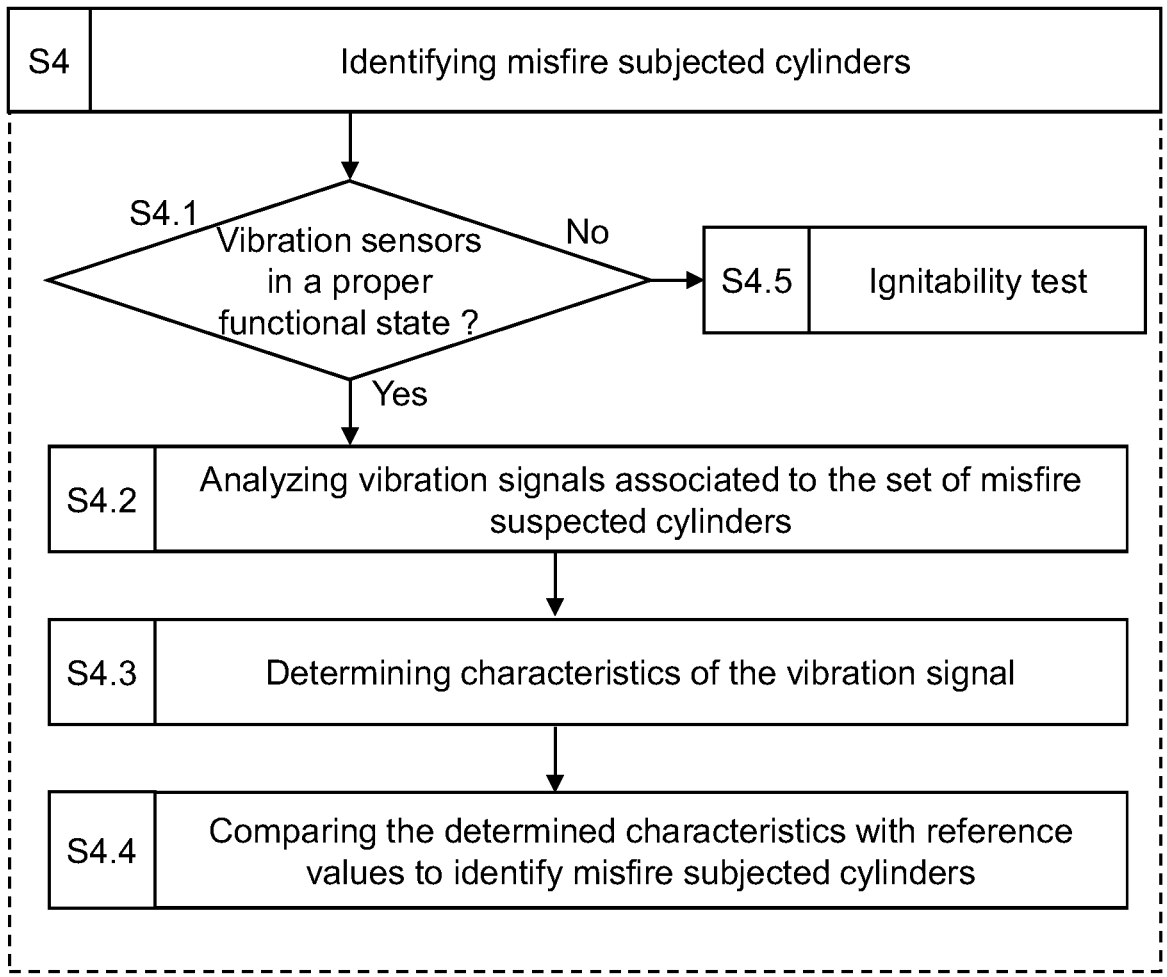
FIG. 5 schematically shows a procedure of a step of the method for identifying misfire subjected cylinders.

Thereafter, the method proceeds to step S4 of identifying the misfire subjected cylinders which is depicted in FIG. 5. This step is performed such that at least one cylinder is identified from the set of misfire suspected cylinders determined in previous method step S3.

In the first sub-step S4.1, a sensor state qualification step is performed for evaluating whether the vibrations sensors used for obtaining the vibration signals are in a proper functional state. In other words, in this step, functionality of the vibration sensors is validated, i.e. to determine whether the sensors are in a proper functional state or not. For doing so, a plausibility check may be performed to evaluate measurements provided by the vibration sensors. For example, the vibration signals provided by the sensors may be compared to reference values or threshold ranges. If the measured signals are within the threshold range, the control unit 20 may determine that the respective vibration sensors are in a proper functional state.

In case the control unit 20 determines that the vibration sensors are in a proper functional state, the method proceeds to sub-steps S4.2 to S4.4 during which a vibration signal based classification, i.e. determination of misfire location, is performed. However, when it is determined that the vibration sensors are not in a proper state, the method proceeds to step S4.5 during which an ignitability test based classification is performed. In this way, a redundancy approach is provided for ensuring that, even in a state in which the vibration sensors are not properly working, a classification of a misfire may be performed yet.

More specifically, in sub-step 4.5, an ignition system of the engine 16 is monitored and tested for classifying the misfire. During this step, the engine 16 is subjected to a functionality test during which the engine 16 is operated in a testing mode in which the engine 16 is run at a reduced or lowered load. More specifically, the engine 16 is activated into a safe mode in which the power of the engine is reduced. Then, an ignition angle is successively retarded for the suspected cylinders in a predefined manner, i.e. one after the other for the cylinders. During each step of retarding the ignition angle, misfire statistics are developed and monitored. Based on these statistics, a misfire location is determined, i.e. those cylinders are identified which are affected by the misfire.

As set forth above, in case the control unit 20 determines that the vibration sensors are in a proper functional state, the method proceeds to sub-steps S4.2 to S4.4 during which a vibration signal based classification is performed.

Specifically, in sub-step S4.2, the control unit 20 analyzes the vibration signals associated to the cylinders comprised in the set of misfire suspected cylinders by continuously monitoring the suspected cylinders, i.e. after the occurrence of a misfire has been detected, in particular by obtaining and analyzing the vibration signals associated thereto. Alternatively, the control unit 20 may analyze the vibration signals associated to the suspected cylinders in a time period associated to the misfire point of time. In this way, the vibration signals may be analyzed retrospective. For doing so, the control unit 20 may be configured to so store the obtained vibration signals for a predetermined time period. The time period associated to the misfire point of time may refer to a time period of a predetermined length around the misfire point of time. In this way, an observation window may be adapted to focus only on relevant sensed vibrations.

In response thereto, in sub-step S4.3, characteristics of the vibration signals in a considered time period are determined or derived. Preferably, the considered time period may refer to a time period associated to one or more operating cycles after a misfire condition has been detected, i.e. after the misfire point of time. Alternatively, the considered time period may refer to a time period associated to the misfire point of time.

In particular, at least one of a frequency, a magnitude and a course of the measured vibrations, i.e. a form of the vibration signal, are determined and quantified in this sub-step. Thereafter, in sub-step S4.4, the thus determined characteristics are compared to reference characteristics or values, i.e. reference frequencies, a reference magnitude or reference form, in order to identify those cylinders subjected to the misfire.

For example, in sub-step S4.3, a frequency of the vibration signal per cylinder may be determined for the considered time period which is then, in sub-step S4.4, compared to a threshold value or frequency. In case the frequency of the vibration signal associated to one cylinder reaches the threshold value or frequency, the control unit 20 may decide that this cylinder is subjected to a misfire.

Alternatively or additionally, in sub-step S4.3, a maximum value of the magnitude of the vibration signal per cylinder may be determined for the considered time period which is then, in sub-step S4.4, compared to a threshold value or magnitude. In case the maximum magnitude of the vibration signal associated to one cylinder equals to or exceeds the threshold value or magnitude, the control unit 20 may decide that this cylinder is subjected to a misfire.

Alternatively or additionally, in sub-step S4.3, a form of the vibration signal per cylinder may be compared to reference forms so as to quantify a similarity value therebetween. For doing so, for example, a difference between the vibration signal and a reference signal constituting a reference form may be quantified which may represent the similarity value. Then, in sub-step S4.4, the similarity value may be compared to a threshold value. In case the similarity value falls below the threshold value, the control unit 20 may decide that the considered cylinder, i.e. which associated vibration signal is considered, is subjected to a misfire.

Figure 6:
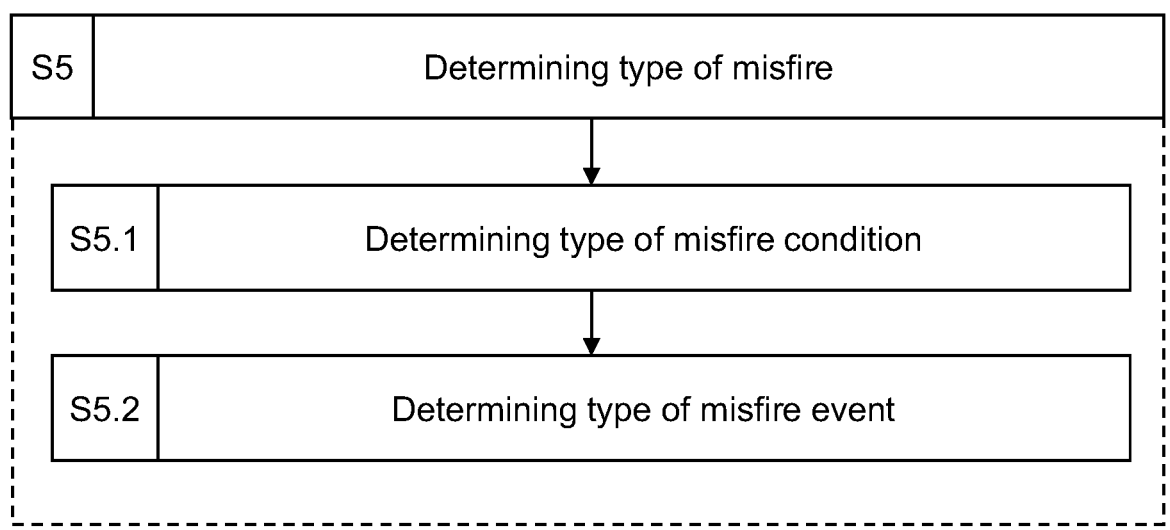
FIG. 6 schematically shows a procedure of a step of the method for determining a type of misfire.

Method step S5 is further specified in the following with reference to FIG. 6, which illustrates its underlying procedure, i.e. its sub-steps and their interaction. In step S5, the control unit 20 further specifies the detected misfire by determining the type of misfire based on its combustion characteristics. For doing so, in a first sub-step S5.1, a type of misfire condition is specified. This step is performed in dependence on the measured vibrations obtained in method step S2. Specifically, in this step, the type of misfire condition is determined, i.e. whether a no combustion condition or an incomplete combustion condition has occurred.

For determining the type of misfire condition, the control unit 20 analyzes the vibration signals associated to the identified cylinders within the considered time period. Specifically, characteristics of the considered vibration signals in the considered time period misfire point of time are determined or quantified, in particular at least one of a frequency, a magnitude and a form of the vibration signal, which are then compared to reference characteristics or values in order to determine the misfire condition. This procedure may be performed similar to the above described steps S4.2 to S4.4, wherein individual determined characteristics of the considered vibration signals are compared to different reference characteristics so as to distinguish between the different types of misfire conditions.

In a second sub-step S5.2, the control unit determines the type of misfire event, the detected misfire is to be associated to. For doing so, the control unit 20 compares the detected misfire to misfires which may have been previously detected, i.e. in previous analyzing loops, so as to determine whether the misfire forms part of a continuous misfire event, an intermittent misfire event or a single misfire event.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

Accordingly, a method may be provided for identifying cylinders of an internal combustion engine which are subjected to misfire during operation, comprising a step of determining whether the engine is subjected to a misfire condition; a step of measuring vibrations generated upon operating the engine; and a step of identifying at least one cylinder subjected to a misfire in dependence on the measured vibrations. Specifically, the term "misfire" may refer to at least one of a no combustion condition and an incomplete combustion condition occurring during at least one operating cycle of a cylinder.

The proposed method provides an approach according to which, at first, it may be determined whether or not a misfire condition has occurred during operation of the engine. Thereafter, the misfire is classified, i.e. further specified, in dependence on the measured vibrations generated upon operating the engine. In this way, a two-step approach is provided enabling that a misfire condition can be detected at short response times, i.e. in real-time or near real-time and, when a misfire has been detected, to further specify the misfire in the further course. In this way, an effective and efficient approach may be provided.

Further, the proposed method may be employed for misfire detection and classification in any suitable internal combustion engine, in particular reciprocating engines. For example, the method may be employed in stationary gas engines, which in particular are used for power generation, but is not limited to such an application. Such gas engines may be powered with a fuel air mixture of a gaseous fuel and air, for example a mixture of natural gas and air.

In a further development, the step of determining whether the engine is subjected to a misfire condition may comprise a sub-step of determining an engine operating signal being indicative of an engine speed or engine power output by the engine and a sub-step of detecting an unintended performance variation of the engine in dependence on the engine operating signal for determining whether the engine is subjected to a misfire.

Further, the method may comprise a step of determining a misfire point of time in dependence on at least one of the measured vibrations and the determined engine operating signal.

In a further development, the step of measuring vibrations may be performed by means of at least one vibration sensor, each of which obtains a vibration signal being indicative of a vibration sensed by the vibration sensor over time, wherein the vibration sensor is at least one of an accelerometer, a knock sensor and a microphone device. According to one configuration of the method, more than one, i.e. at least two vibration sensors are used for measuring vibrations, wherein the vibration sensor are installed or provided spaced apart from one another in or at the engine.

Alternatively or additionally, the method may further comprise a step of determining a set of misfire suspected cylinders in dependence on the misfire point of time and ignition enable pulses, each of which is associated to one cylinder. Specifically, the step of predetermining a set of misfire suspected cylinders comprises the sub-steps of determining ignition enable pulses which are or were activated within a predetermined temporal range around the misfire point of time; and of identifying those cylinders which are associated to ignition enable pulses falling within the temporal range.

Further, the step of identifying the at least one cylinder may be performed such that at least one cylinder is identified from the set of misfire suspected cylinders. In other words, only cylinders may be identified in this step which form part of the set of misfire suspected cylinders.

In a further development, the step of identifying the at least one cylinder may be performed by analyzing the measured vibrations in a time period associated to the misfire point of time. Alternatively or additionally, in the step of identifying the at least one cylinder, a characteristic of the measured vibration, in particular at least one of a frequency, a magnitude and a course of the measured vibration, may be determined and compared to reference characteristics in order to identify the at least one cylinder subjected to the misfire.

Further, the method may comprise a step of determining a type of misfire condition in dependence on the measured vibrations to distinguish between a no combustion condition and an incomplete combustion condition. Specifically, in the step of determining a type of misfire condition, a characteristic of the measured vibration, in particular a magnitude, a frequency and a course of the measured vibration, may be determined and compared to reference characteristics being associated to different types of misfire conditions in order to identify the type of misfire condition.

In a further development, the method may comprise a step of validating functionality of the at least one vibration sensor used for measuring the vibrations, wherein when it is determined that the vibration sensor is not in a proper functional state, the engine is subjected to an ignitability test during which the engine is operated at reduced load.

Furthermore, a control unit of an internal combustion engine may be provided for identifying cylinders of the engine which are subjected to misfire during operation. The control unit may be configured for determining whether the engine is subjected to a misfire condition, for obtaining at least one vibration signal being indicative of a vibration generated by the engine upon operation and measured by a vibration sensor, and for identifying at least one cylinder subjected to a misfire in dependence on the vibration signal.

INDUSTRIAL APPLICABILITY

With reference to the Figures and their accompanying description, a method and control unit for identifying cylinders of an internal combustion engine are suggested. The method and the control unit as mentioned above are applicable in internal combustion engines provided, for example, as stationary gas engines. The suggested method may be performed in or for conventional internal combustion engines. Further, the suggested control unit may replace conventional control units and may serve as a replacement or retrofit part.

The invention claimed is:

1. A Method for identifying cylinders of an internal combustion engine which are subjected to misfire during operation, comprising:
    a step (S1) of determining whether the engine is subjected to a misfire condition;
    a step (S2) of measuring vibrations generated upon operating the engine;
    a step of determining a misfire point of time in dependence on at least one of the measured vibrations and an operating signal being indicative of an engine speed or engine power output by the engine;
    a step (S3) of determining a set of misfire suspected cylinders in dependence on the misfire point of time and ignition enable pulses, each of which is associated to one cylinder; and
    a step (S4) of identifying at least one cylinder subjected to a misfire in dependence on the measured vibrations.

2. The method according to claim 1, wherein the misfire refers to at least one of a no combustion condition and an incomplete combustion condition occurring during an operating cycle of a cylinder of the engine.

3. The method according to claim 1, wherein the step (S1) of determining whether the engine is subjected to a misfire condition comprises a sub-step of determining the engine operating signal and a sub-step of detecting an unintended performance variation of the engine in dependence on the engine operating signal for determining whether the engine is subjected to a misfire.

4. The method according to claim 1, wherein the step (S2) of measuring vibrations is performed by means of at least one vibration sensor, each of which obtains a vibration signal being indicative of a vibration sensed by the vibration sensor over time, wherein the vibration sensor is at least one of an accelerometer, a knock sensor and a microphone device.

5. The method according to claim 4, wherein at least two vibration sensors are used for measuring vibrations which are provided spaced apart from one another.

6. The method according to claim 1, wherein the step (S3) of determining a set of misfire suspected cylinders comprises:
    a sub-step (S3.3) of determining ignition enable pulses which are activated within a predetermined temporal range around the misfire point of time; and
    a sub-step (S3.4) of identifying at least one cylinder which is associated to ignition enable pulses falling within the temporal range.

7. The method according to claim 6, wherein the step (S4) of identifying the at least one cylinder is performed such that at least one cylinder is identified from the set of misfire suspected cylinders.

8. The method according to claim 1, wherein the step (S4) of identifying the at least one cylinder is performed by analyzing the measured vibrations in a time period associated to the misfire point of time.

9. The method according to claim 1, wherein in the step (S4) of identifying the at least one cylinder, a characteristic of the measured vibration, in particular at least one of a frequency, a magnitude and a course of the measured vibration, is determined and compared to reference characteristics in order to identify the at least one cylinder subjected to the misfire.

10. The method according claim 1, further comprising a step (S5.1) of determining a type of misfire condition in dependence on the measured vibrations to distinguish between a no combustion condition and an incomplete combustion condition.

11. The method according to claim 10, wherein in the step (S5.1) of determining a type of misfire condition, a characteristic of the measured vibration, in particular a magnitude, a frequency and a course of the measured vibration, is determined and compared to reference characteristics being associated to different types of misfire conditions in order to identify the type of misfire condition.

12. The method according to claim 4, further comprising a step (S4.1) of validating functionality of the vibration sensor, wherein when it is determined that the vibration sensor is not in a proper functional state, the engine is subjected to an ignitability test during which the engine is operated at reduced load.

13. A Control unit of an internal combustion engine for identifying cylinders of the engine which are subjected to misfire during operation, wherein the control unit is configured for:
  determining whether the engine is subjected to a misfire condition,
  obtaining at least one vibration signal being indicative of a vibration generated by the engine upon operation and measured by a vibration sensor,
  determining a misfire point of time in dependence on at least one of the measured vibrations and an operating signal being indicative of an engine speed or engine power output by the engine;
  determining a set of misfire suspected cylinders in dependence on the misfire point of time and ignition enable pulses, each of which is associated to one cylinder and
  identifying at least one cylinder subjected to a misfire in dependence on the vibration signal.

* * * * *